Aug. 26, 1952     J. L. FROST     2,608,416
TRAILER DOLLY
Filed Aug. 11, 1951
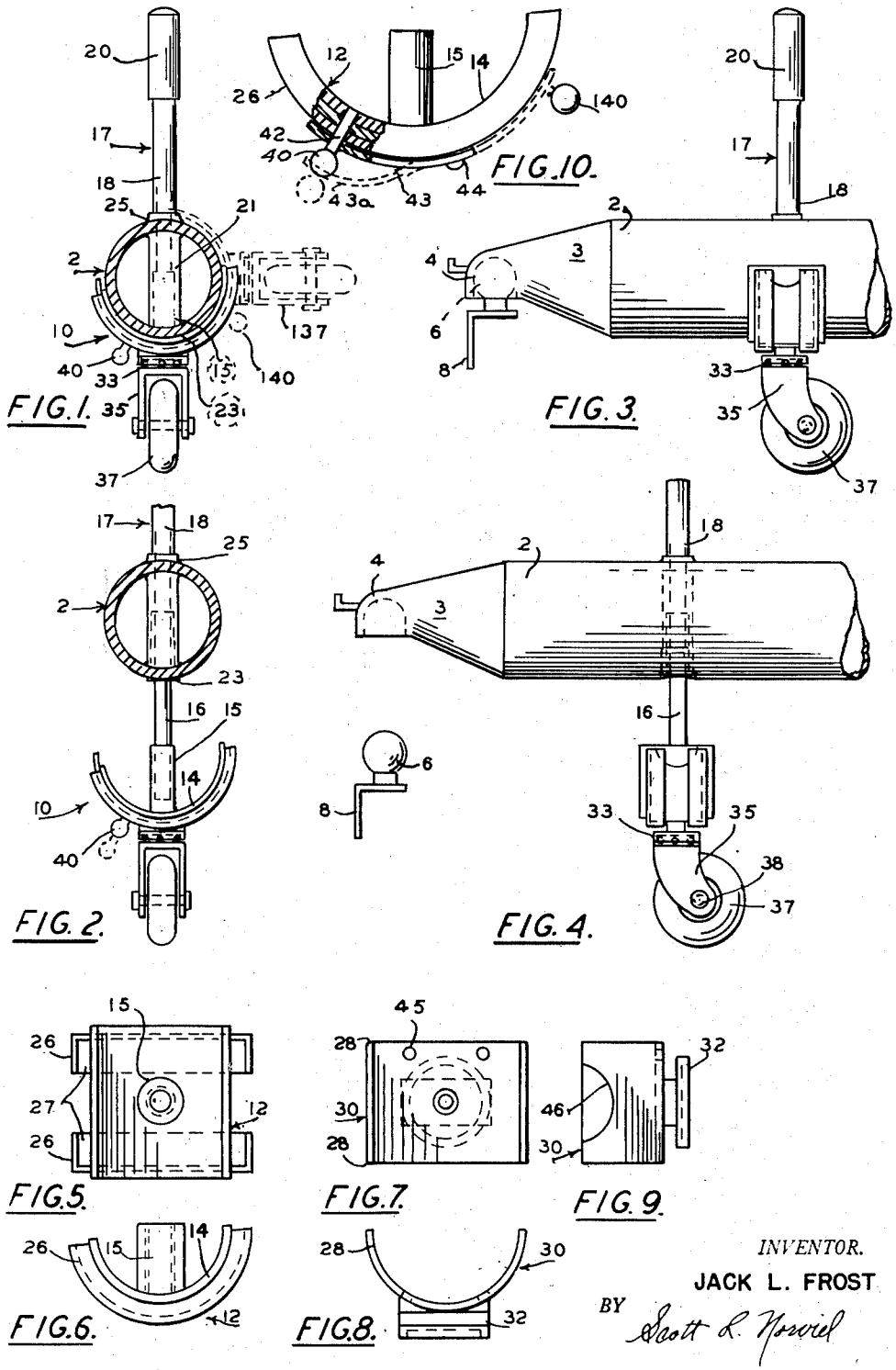
INVENTOR.
JACK L. FROST
BY Scott L. Norvel Patented Aug. 26, 1952

2,608,416

UNITED STATES PATENT OFFICE 2,608,416

TRAILER DOLLY

Jack L. Frost, Tucson, Ariz.

Application August 11, 1951, Serial No. 241,424

3 Claims. (Cl. 280—33.4)

This invention pertains to trailer dollies, particularly of the type used for handling the trailer when parking and when hitching and unhitching.

One of the objects of the invention is to provide a trailer dolly which will lift and sustain the trailer draw bar or tongue with a minimum of effort and enable the user to unhitch or hitch the draw bar to the tractive vehicle, or move the draw bar about to effect positioning or parking of the trailer body.

Another object is to provide a trailer dolly with a caster wheel mounted on an arcuate support arranged so that it can be swung laterally upward to clear the ground when the trailer is being drawn.

Another object is to provide a trailer dolly which has a body portion readily adaptable for attachment to a trailer draw bar, and which will accept a vertically operating jacking means to lower a laterally swinging retractable caster mounted dolly wheel so that the draw bar will be raised.

Still another object is to provide a trailer draw bar dolly which has a body adapted to receive a cylindrical draw bar so that the draw bar may be directly raised by a jack having a vertically extending push rod, and which also has a pair of arcuate grooves in which a dolly wheel carrier travels, in a manner so that the dolly wheel may be swung laterally and upward, when desired.

Other objects will appear hereinafter.

I attain the foregoing objects by the devices and construction shown in the accompanying drawings in which—

Figure 1 is an end elevation of the dolly construction with the front end of the trailer draw bar sectioned off to show interior construction;

Figure 2 is a front end elevation of the dolly, as applied to a trailer draw bar, with the draw bar sectioned off to show interior construction, and with the draw bar in raised position relative to the dolly body;

Figure 3 is a side elevation of the dolly applied to a trailer draw bar, with the draw bar lowered and resting on the dolly body;

Figure 4 is a side elevation of the dolly as applied to a trailer draw bar, with the draw bar elevated above the dolly body;

Figure 5 is a plan view of the dolly body;

Figure 6 is an end elevational view of the dolly body;

Figure 7 is a plan view of the arcuate caster wheel support;

Figure 8 is an end elevational view of the arcuate caster wheel support;

Figure 9 is a side view thereof; and

Figure 10 an end view showing arcuate caster wheel latch drawn on an enlarged scale.

Similar numerals refer to similar parts in the several views.

As here illustrated the draw bar or tongue 2 is tubular and cylindrical, and has a somewhat conical end 3 which terminates in a conventional hitch ball socket 4 which is designed to accept and fit over hitch ball 6 on angle bar 8, either attached to, or a part of, a traction vehicle.

As here shown the dolly, generally, is indicated by numeral 10. The dolly body 12 is transversely arcuate and has its upper face 14 concavely curved to cradle the lower portion of the tubular draw bar 2. Welded in the center of this upper face there is a boss 15 which extends upward and is centrally bored and threaded to receive the downwardly extending piston rod 16 of hydraulic jack 17. This piston rod has a piston at its upper end which works in cylinder 18.

In the particular form of jack 17, here shown, oil is introduced into the upper end of cylinder 18 by a small plunger pump operated by reciprocating handle 20 up and down manually. A by-pass valve is opened and closed by twisting handle 20. After the piston has been forced out or downward by working handle up and down, it may be released and allowed to recede into cylinder 18 by twisting or turning handle 20 which opens the by-pass valve and allows the oil to run out of the cylinder and return to a reservoir in the upper part of the cylinder structure. No details of this form of jack are shown because it is a patented item, now on the market, and well known to those familiar with the art. Since this patent concerns a dolly in which I make use of a jack, I choose to show this form of jack because of its convenience. It is to be understood that any form of jack may be used which has a body corresponding to cylinder 18 from which a moving element, corresponding to piston rod 16, may be extended.

A sleeve 21 is threaded onto the lower end of cylinder 18 and extends through draw bar 2 along a diametrical line and is counter bored to accept the upwardly extending portion of boss 15. The lower portion of draw bar 2 is welded at 23 and the upper portion at 25 to the respective ends of sleeve 21. This construction requires that sleeve 21 and boss 15 have their axes alined and that this alinement is diametrical with reference to draw bar 2.

On the lower or outer face of dolly body 12 and adjacent each end there are arcuate guide channels 26. The grooves 27 of these channels open inwardly and face each other. These channels accept the curved end portions 28 of arcuate caster wheel support 30. These parts are made so that caster wheel support will slide around the dolly body while it is retained by said guide channels. A caster wheel pivot plate 32 is attached to the under face of support 30 and is made to accommodate a caster bearing 33. From the lower portion of this bearing the caster wheel cheek plates 35 depend and caster wheel 37 is journalled on a shaft 38, extending between these plates, in any convenient manner.

When the caster wheel is attached to caster wheel support 30 and this support retained in channels 26 the caster wheel 37 will normally extend downward as in Figures 1 and 3. In running, however, it is necessary to move wheel 37 out of the way of road obstructions, high centers and the like. To do this the entire caster wheel assembly including its support 30, bearing 33, bearing cheeks 35 and wheel 37 are moved laterally, out of the way by rotating support about dolly body 12. Edges 28 slide in grooves 27, and this assembly then assumes the position shown by the dotted outline 137, Figure 1. After this movement the caster wheel turns on its bearing 33, ninety degrees so that its heaviest portion depends from its support.

To hold the caster bearing support in either the downwardly extending position or the out-of-the-way lateral position I provide a pin 40, which has a convenient knob handle and a slightly tapered shank 42, mounted on an arcuate spring 43 which is pivotally mounted on pin 44 on the outer surface of one channel 26. Hole 45 is provided thru this channel and is pulled into appropriate positions in holder 30 so that the shank 42 may be inserted thru both the channel and the holder end edge, in either the position shown by solid lines in Figure 1, or the position shown by dotted outline 140. This pin and spring structure may be termed the dolly wheel holder positioning latch. To release the latch shank the pin is pulled out thereby flexing spring 43 as shown by dotted lines 43a in Figure 10. The spring may then be swung and inserted thru similar holes when it is in the position indicated by numeral 140.

Caster wheel support 30 is notched on one side at 46 to clear collar 21 when it is in raised position. Since the sliding action of the wheel support takes place for the most part on the right side of the draw bar as viewed in Figure 1, the dolly body is tilted slightly (or rotated slightly counter clockwise) so as to provide adequate support when the dolly wheel and its holder are raised to the lateral position.

Whereas, I have shown my device as attached to a cylindrical draw bar, it will be easily understood that sleeve 21 may be welded, or otherwise attached to draw bars of various shapes and sizes, carrying other types or forms of hitches than the one here illustrated.

I claim:

1. In combination with a trailer draw bar having a jack with a downwardly operating piston element secured thereto, a trailer dolly consisting of an arcuate body having an upwardly extending boss centrally positioned in its concave upper face, axially bored and threaded to receive and retain said piston element, arcuate guide channels on the under face of said arcuate body; an arcuate dolly wheel holder having its end edges slidably retained in said guide channels and having a caster mounted dolly wheel attached to its lower face; and a dolly wheel holder positioning latch secured to said body having a pin adapted to be inserted thru holes in said caster wheel holder to latch it in either dolly wheel riding position, or in laterally upwardly swung position.

2. A trailer dolly for use on a trailer draw bar having a jack, with a downwardly extensible piston rod, attached thereto, including an arcuate dolly body positioned with its concave side upward, a vertically extending boss in the center of said concave upper side attached to the lower end of said jack piston rod, and arcuate guide channels at each end of its under side; an arcuate dolly wheel holder shaped so that its upper face conforms to the lower face of said body and having its curved end edges slidably retained in said guide channels so that it will slide from a lowered position to a laterally retracted position, a dolly wheel mounted on a caster bearing extending from the lower face of said dolly wheel holder; and a wheel holder positioning latch, operating between said dolly body and said arcuate dolly wheel holder, to latch said dolly wheel holder in either downwardly extending position, or in laterally retracted position with said dolly wheel extending laterally from said dolly body.

3. Trailer dolly construction, for attachment to a cylindrical tubular draw bar of a trailer, having a jack body attached thereto with a downwardly extensible piston element, comprising in combination, a dolly body curved transversely to conform to the lower surface of the draw bar on which it is to be used to provide an arcuate upper and lower surface; a centrally positioned boss attached to its upper surface secured to said downwardly extensible jack element, and arcuate guides having inwardly and oppositely opening guide ways attached near the ends of its lower surface; a transversely arcuate dolly wheel holder having its upper surface generally conforming to the lower surface of said dolly body and its end edges slidably secured in said arcuate guideways; a caster wheel mounting on the lower surface and of said dolly wheel holder; a dolly wheel mounted in said caster wheel mounting; and a dolly wheel holder latch arranged to secure said dolly wheel holder so that said castered dolly wheel extends either downward, or horizontal as desired.

JACK L. FROST.

REFERENCES CITED

The following references are of record in the file of this patent:

UNITED STATES PATENTS

| Number | Name | Date |
|---|---|---|
| 1,044,581 | Sailer | Nov. 19, 1912 |
| 1,784,428 | Goldman | Dec. 9, 1930 |
| 2,555,336 | Hagely | June 5, 1951 |

FOREIGN PATENTS

| Number | Country | Date |
|---|---|---|
| 497,338 | Great Britain | Dec. 15, 1938 |